(12) United States Patent
Huber

(10) Patent No.: US 6,986,580 B1
(45) Date of Patent: Jan. 17, 2006

(54) LATENT EFFECTS PROJECTION SYSTEM

(75) Inventor: Mark J. Huber, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 11/084,977

(22) Filed: Mar. 21, 2005

Related U.S. Application Data

(63) Continuation of application No. 10/680,841, filed on Oct. 6, 2003, now Pat. No. 6,923,543.

(60) Provisional application No. 60/416,846, filed on Oct. 8, 2002.

(51) Int. Cl.
*G02B 5/30* (2006.01)

(52) U.S. Cl. ......................... 353/20; 359/501

(58) Field of Classification Search ................ 353/8, 353/20, 122; 349/15, 96; 359/458, 500, 359/501, 465, 489, 492, 502

See application file for complete search history.

(56) References Cited

U.S. PATENT DOCUMENTS

| | | | | |
|---|---|---|---|---|
| 4,928,123 | A * | 5/1990 | Takafuji | 353/20 |
| 5,793,470 | A * | 8/1998 | Haseltine et al. | 353/20 |
| 5,929,946 | A * | 7/1999 | Sharp et al. | 349/18 |
| 5,993,004 | A | 11/1999 | Moseley et al. | |
| 6,301,044 | B1 * | 10/2001 | Huber et al. | 359/483 |
| 2003/0128427 | A1 * | 7/2003 | Kalmanash et al. | 359/484 |
| 2003/0137734 | A1 * | 7/2003 | Damask | 359/497 |
| 2004/0001255 | A1 * | 1/2004 | Fratello | 359/484 |

* cited by examiner

*Primary Examiner*—William C. Dowling
(74) *Attorney, Agent, or Firm*—Greenberg Traurig; Christopher Darrow, Esq.

(57) ABSTRACT

Latent effects projection systems that allow a latent effects projector to be used in connection with various materials, such as wall pieces, floor tiles, signage, hangings, and the like; use reflective polarizers having various looks and/or which allow for the development of different color palettes; which are relatively insensitive to heat; and/or use plural retarders to generate relatively more saturated colors and/or latent colors that are substantially repeatable.

24 Claims, 13 Drawing Sheets

Sweep through

Rotate

LATENT EFFECTS PROJECTION SYSTEM

RELATED APPLICATION

This application is a continuation claims the benefit of U.S. patent application Ser. No. 10/680,841 filed on Oct. 6, 2003 now U.S. Pat. No. 6,923,543, which claims the benefit of U.S. Provisional Patent Application No. 60/416,846 filed Oct. 8, 2002, the disclosures of which are hereby incorporated by reference in their entireties.

BACKGROUND

General Background

The disclosure generally relates to special effects systems and, more specifically, to a latent effects projection system. Such a system may be used, for example, to enable the provision of visual effects, such as color and/or images, to apparel, architectural and wall pieces/treatments, floor tiles, signage, transparent hangings with colored shadows, art pieces, or the like.

In certain circumstances, it is desirable to project visual information by means of light onto various objects. For example, this could include a desire to change an appearance or color of an object. In another example, a pattern of light and dark, which can be turned on and off or changed, may be desired. Still photo, motion picture, or video imagery may be desired to be projected onto surfaces such as walls, floors, statuary, sculptures as well as the other forms of images, all comprising visual information.

For all purposes relating to this application "visual information" will be defined as all types and kinds of information transmissible by projected light and perceivable by a viewer, or which can be made perceivable by manipulation of the light before it reaches the viewer, including, but not limited to: a change in intensity of perceived light, a single color; multiple colors; patterns of light and patterns of colored light, still and motion picture images; video and other pixeled images; anaglyphic images, including those enabling a three dimensional effects to be perceived on a surface, written information and other data; and image animation. Some of these types and kinds of visual information will be discussed separately and specifically, but it is intended that the concept of what comprises "visual information" be broadly interpreted. For example almost any perceptible attribute or change in an attribute of light impinging upon the eye of a viewer can potentially convey at least a part of conveyed visual information. It does not itself need to be directly cognizable by the viewer. In this context, another example of what visual information can be is time-sequential, periodic, light polarization plane orientation angle changes occurring rapidly to very infrequently, as these can be used for example in providing timing data and/or cues for coordination of events in a performance. "Visual effects" is a term of art, and all meanings that it has in the art will herein be invoked, as well as any other projection of light comprising visual information. "Anaglyphic" is defined to include all methodologies for producing a three-dimensional visual effects including, but not limited to polarization separation, and color separation, of right and left eye images. "Viewer" will be understood to include not only persons viewing the visual effects directly, but also image capture devices such as still, motion picture and video cameras, and other light receiving and transmitting devices making the effects perceptible indirectly. "Image" will be understood to include all its customary meanings in this context, and will include but not be limited to: all forms of motion picture, video, photographic, animation, pictorial and graphic visual information, which is, or can by manipulation be made, visible, and can comprise for example a black, white or single color field, a pattern of light having contrast between different portions, including a likeness or representation of a person, animal, pattern, abstract composition, writing, or object or thing.

The problem addressed is illustrated by a desire to produce visual effects upon objects such as wall or floor surfaces, statuary, sculptures or other two or three-dimensional surfaces. The idea of producing changeable color and/or graphic and pictorial imagery on object surfaces has been known for several decades. There have been several different conventional approaches. In one approach video image producing devices are placed on a person or object. In another approach video or film images are directed through an optical system and projected onto the person or object. In yet another approach, as described in commonly assigned U.S. Pat. No. 6,301,044, which is hereby incorporated by reference in its entirety, a latent image projector is utilized to effects color and image changes on the surface of apparel. In the first-mentioned approach a video-producing device, such as an LCD panel, is placed on a surface. It will be appreciated that the video-producing device is usually with associated electrical cables. Accordingly, one of the problems with this approach is that electrical equipment, connectors, cables, batteries, power and signal supply cables from a remote source, and the electrical voltages associated with these devices, are directly placed about the surface. This can be unsightly, hazardous and unwieldy.

In the second-mention approach color and/or imagery is projected onto a person, object, or surface, using a light such as a spotlight, or projecting a still or motion picture, recorded or live video and the like, onto the performer(s) or object. A problem with this technique is that the imagery appears on all surfaces impinging on the projected light. In short, the imagery appears on the object, as intended, but also the exposed skin and hair of a performer, or unintended surfaces on other two or three-dimensional objects as well as on the background. Highly reflective clothing can be used, for example, and a non-reflective background and makeup, to minimize this "blow by" image being perceived other than on the apparel or other surface where intended. However, the color or image projected will still appear on these surfaces to some extent, particularly the face and hands of the performer if exposed. Also, using a non-reflective background conventionally precludes combination of the effects with background visuals other than black surfaces adjacent the performer(s). Moreover, a black background is usually not completely non-reflective, and so some projected color or image may be discernible to a viewer or an audience.

In the third mentioned approach, a latent effects projector projects light comprising polarized-encoded latent visual information, such as color and/or an image, enabling a visual effect upon clothing. Generally, the latent effects projector utilizes polarizers and birefringent materials to project "invisible" effects. The projected effects remain invisible until the light rays impinge on a second polarizer that changes the "invisible" effects to visible effects. While the system and method described in U.S. Pat. No. 6,301,044 does work for its intended purpose, it has been seen that various improvements may be made.

SUMMARY

To address these and other needs, the following is directed to an improved latent effects projection system. In this regard, described hereinafter are improved latent effects projection systems that, among other things, allow a latent effects projector to be used in connection with various materials, such as wall pieces, floor tiles, signage, hangings, and the like. Further described are improved latent effects projection systems utilizing reflective polarizers having various looks and/or which allow for the development of different color palettes. Yet further described are improved latent effects projection systems that are relatively insensitive to heat. Still further described are improved latent effects projection systems that use retarders to generate relatively more saturated colors and/or latent colors that are substantially repeatable. An understanding of these features as well as the advantages, properties and relationships of the systems and methods hereinafter disclosed will be obtained from the following detailed description and accompanying drawings which set forth illustrative examples which are indicative of the various ways in which the principles thereof may be employed.

DRAWINGS

The above-mentioned features and objects of the present disclosure will become more apparent with reference to the following description taken in conjunction with the accompanying drawings wherein like reference numerals denote like elements and in which:

Latent effects projection systems are hereinafter described with reference to examples shown in the following drawings in which.

DETAILED DESCRIPTION

Figure 1:
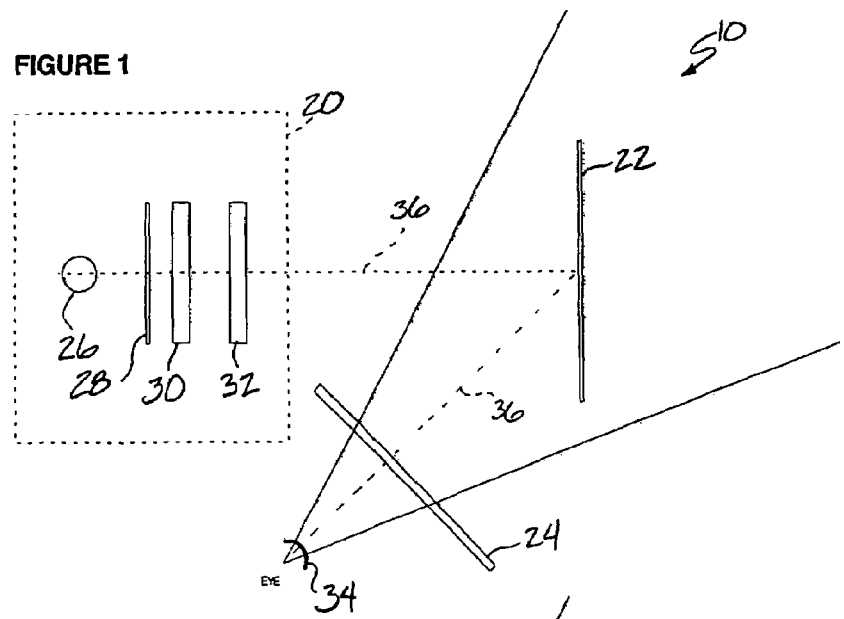
FIG. 1 is a schematic diagram of an exemplary visual effects system.

With reference to the drawings, which are given by way of illustration and not by way of limitation of the scope of the disclosure, FIG. 1 illustrates schematically a visual effects system, in this embodiment a latent effects projection system 10. The system comprises a latent effects projector 20, a polarization maintaining material 22, and an independent polarizer (called the polarizing analyzer), or analyzer 24. The latent effects projector is comprised of a light source 26, a plane polarizer, called the pre-polarizer 28, a birefringent material element 30, and an optional projection lens 32.

In the latent effects projector 20, natural, non-polarized light rays from the light source 26, which are made essentially parallel to one another, impinge on the pre-polarizer 28. These parallel light rays, in passing through the pre-polarizer, become plane polarized in the privileged direction of the pre-polarizer. In a plane polarized light ray, the electric vector ("e-vector") of the light ray is composed of two, in phase, identical frequency, and orthogonal components. A plane polarized light ray can be discussed in terms of either these two components, or as the vector sum of these two components. When a plane polarized light ray is discussed in terms of the vector sum of the two components, it is visually thought of as a 'wave' constrained to a single plane of oscillation. This single plane of oscillation is called the privileged plane of the pre-polarizer.

For simplicity in this discussion, the light source will be discussed as if it were a monochromatic light, that is light of only one frequency. It will be understood however, that the light source can be one that projects light of single or multiple wavelengths, comprising at least those perceivable by the viewer 34 as the range of colors desired for the system. Light of wavelengths that are not perceptible by humans can be included, such as infrared. Such light can be used for other purposes, for example timing and cue signaling, when not intended to be seen by audience viewers. Such light could be "seen" by other viewers such as electronic equipment and/or actors and technicians wearing special glasses, for example, to trigger events and effects, which in turn are seen by the viewers in the audience or by a camera or other device capturing the effects. Examples of light sources that have been used include a Dersken Visual Impact System Lighting Instrument, made by Derksen Lichttechnic of Germany, using a GL 200 MSD lamp. Another light source is a Source Four Ellipsoidal Lighting Instrument manufactured by Electronic Theater Controls, which has a place of business in Glendale Calif. The lamp used with the latter is an Osram Halogen Photo Optic Lamp, part number BTL 500W 120V P28s NAED 54685 available from Osram Corporation of Winchester Ky.

Plane polarized light from the pre-polarizer 28 then impinges on the birefringent material 30. At the surface of the birefringent material the two components of the plane polarized light ray are exactly in phase with one another. As the two components move through the birefringent material, the phase relationship between the two components can be changed due to a process called retardation. Retardation is caused by the physical interaction between the birefringent material and the two components of the plane polarized light ray.

Birefringent materials are transparent substances that exhibit at least two indices of refraction. Birefringent materials have structures that are chemically or physically asymmetric. This asymmetry manifests as different indices of refraction as a function of the direction of vibration, of a light ray, in that material. The vibration directions defined by these indices of refraction can be at any non-zero angle in relation to each other. Vibration directions that fall between these two extremes exhibit intermediate indices of refraction. The maximum birefringence of the substance is the numerical difference between the highest and lowest index of refraction value found in the substance. Birefringent materials typically exhibit at least one direction of propagation through the material in which all vibration directions have the same index of refraction. This special case is called the optic axis of the material. In a generalized case, these birefringent materials 30 are considered to have parallel surfaces, normal to the light path 36 with a uniform thickness and a uniform (non-zero) birefringence across the active area of the material.

The two components of a plane polarized light ray will generally experience different indices of refraction upon entering the birefringent material. In this case, one of the components (called the O-ray) takes a path through the material where the direction of propagation of the component is perpendicular to the wave front normal of the wave. In this case the O-ray travels straight though the birefringent material. The other component (called the E-ray) moves along a direction that is not perpendicular to the wave front normal. In this case the E-ray moves at an angle to the perpendicular direction through the material. The O-ray and the E-ray therefore take different directions through the material.

The indices of refraction that the O-ray and E-ray will experience are dependent on the orientation of the plane polarized light ray as it impinges on the birefringent material. In an ideal case, the O-ray and the E-ray could coincidentally align with the maximum and minimum vibration directions of the material. In this case the O-ray would experience either the maximum or minimum index of refraction of the material, while the E-ray would experience the other extreme index of refraction value. In a more general case, the O-ray and the E-ray could align with any of the intermediate indices of refraction. In this case, the indices of refraction experienced by the O-ray and the E-ray would be intermediate values between the two extremes. Finally, in the special case where the propagation direction of the plane polarized light ray is along the optic axis of the material, the O-ray and the E-ray experience exactly the same index of refraction, and the material does not exhibit the property of birefringence.

The fact that the O-ray and the E-ray experience different indices of refraction and different travel directions through the material allows the phase of one component to be changed in respect to the other component. Since the velocity of light in a medium is a function of the index of refraction, it follows that the velocities of the O-ray and the E-ray will be different in the material if they experience different indices of refraction. Since the O-ray and E-ray take different paths through the material it follows that the path lengths can be different. Given both a velocity and a path length difference, it follows that the phase of one of the components can be changed in respect to the other component. In short, if the two components of the plane polarized light ray start out in phase at the first surface of the birefringent material, then the phase relationship between the components can be changed by the time both components travel through the material.

The phase difference between the two components defines the type of polarized light that will be emitted from the second surface of the birefringent material. If the two components are in phase at the second surface of the birefringent material, then there is a zero phase difference and the light ray passes through the material without any change in polarization state. The emitted light will still be plane polarized with a polarization angle parallel to the privileged direction of the pre-polarizer. The birefringent material in this case is called a full wave retarder. If the two component light rays are 180 degrees out of phase at the second surface of the material, then the transmitted light will be plane polarized with a polarization angle non-parallel (90 Degrees) to the privileged direction of the pre-polarizer. The birefringent material in this instance is called a half wave plate. If the two components are in any other phase relationship with one another, the resultant electric vector of the emitted light will rotate rather than stay in a single plane of oscillation. In these cases, the emerging light is no longer plane polarized. In the special case where the e-vector is rotating and the amplitudes of both components are identical, the emerging light ray is circularly polarized. In this instance, the birefringent material is called a quarter wave plate. In all other cases, where the e-vector is rotating and the amplitudes of the components are not identical, the emerging light is elliptically polarized.

Since the index of refraction of a birefringent material 30 varies with the wavelength of incident light, the phase difference between the contributing components at the second surface of the birefringent material is also wavelength dependent. Given a broad spectrum light source 26 and a specific birefringence, each wavelength of light transmitted from the latent effects projector could theoretically have a unique angle of its plane of polarization with reference to the privileged plane of polarization of the pre-polarizer. In this context, the system would be capable of outputting specific frequencies of light at very specific angles in reference to the privileged plane of the pre-polarizer. However, most birefringent materials do not act in such a well-behaved, orderly and predictable fashion. This means that the color tuning of the system is still very much an art. The light emerging from the birefringent material will be referred to as being polarization encoded. The polarization-encoded light can then be passed through the optional projection lens.

In the above discussion, the term pre-polarizer has been used to refer to a linear polarizer. In the same discussion, the text reads as if there is an air gap between the pre-polarizer and the birefringent material. At this point it is important to recognize that the pre-polarizer can actually be of two types. The pre-polarizer can be a linear polarizer as discussed above, or it can be a circular polarizer. As is immediately clear, a circular polarizer is nothing more than a linear polarizer and a ¼ wave retarder plate bonded together at a specific angle.

In the above discussion, birefringent materials were discussed as if they were a single element in the system. At this point it is important to realize that more than one birefringent material can be stacked up to form a series of birefringent materials. The benefit of multiple birefringent materials is two fold. In the first case, it provides greater control of the color range of the system. As an example, a full wave retarder plate is typically limited to two colors. The insertion of a second optically active substance can allow you to increase this pallet of color. In the second case, it provides greater control of the rate at which colors can be changed. In this context, with the full wave retarder plate, a color and its compliment are separated by 90 degrees. The insertion of a second retarder into the system allows a change in this angle of separation and hence the speed at which a color change occurs.

In the above discussion, birefringent materials were discussed as if all materials of this type were planer in cross section. At this point is important to realize that any birefringent material can be used as an optical element in this system. This includes standard optical wedges as well as non-traditional optical elements such as spheres, spoons and even transparent dinner plates. In some instances, broken and non-functional LCD panels, which have had the analyzer pulled off, can also be used.

In the above discussion, birefringent materials were discussed as if the best materials were quarter wave, half wave and full wave retarders. At this point it is important to realize that the best color systems found to date are not limited exclusively to readily available scientific retarder plates. For example, the color system may be composed of a linear polarizer, a quarter wave plate, and two ⅛-inch pieces of a polycarbonate material of the brand name Lexan. In this context, the two pieces of polycarbonate do not have identical optical properties, but in combination they generate an adequate color though the system.

Continuing discussion of the latent effects projection system 10, the polarization encoded light rays from the latent effects projector 20 are focused onto the surface of a polarization maintaining material 22. The polarization encoded light rays are reflected off of the polarization maintaining material, where they travel through the air and through the analyzer 24 and eventually reach the viewer 34. An exemplary path 36 of the light rays as they travel as just described is shown.

In this system, the angle of the plane of polarization of the analyzer, with respect to the privileged direction of the pre-polarizer, can be any angle desired. In this orientation, only those plane polarized light rays with planes of polarization rotated sufficiently by the birefringent material to match those of the analyzer can pass through the analyzer.

In this latent effects projection system 10, the viewer 34 perceives a resolved, single (visible) color on the surface of the wearable polarization maintaining material 22. In order to change the color over the multiple colors from the latent effects system, the planes of polarization of one or more of the various optical elements 28, 30, 24 can be changed dynamically in respect to the other optical elements. The polarization encoded light appears as simple white light on any other material inserted into the path of the polarization encoded light rays.

In one embodiment, the angular relationship between the planes of polarization of the pre-polarizer 28, the birefringent materials 30 and the analyzer 24 are established once and remain fixed. In general, it is best to set the plane of polarization of the analyzer to be either parallel (0 degrees) or perpendicular (90 Degrees) to the privileged direction of the pre-polarizer. In this embodiment, the viewer 34 perceives a resolved (visible) color on the surface of the polarization maintaining material 22. This is a single latent effects projection system, in that the system is only capable of projecting one color through the fixed optical elements. When the light from the light source is allowed to fluctuate through time, the latent effects can be made to appear and disappear. The light appears as simple white light on any other material inserted into the path of the polarization encoded light rays.

In another embodiment, the angular relationship between the planes of polarization of the pre-polarizer 28 and the analyzer 24 is allowed to change through time and the birefringent materials 30 are deleted from the light path. In this latent effects projection system, when the planes of polarization of the pre-polarizer and the analyzer are parallel (0 degrees), the eye perceives white light on the surface of the polarization maintaining material 22. When the planes of polarization of the pre-polarizer and the analyzer are perpendicular (90 degrees), all light is blocked from traveling through the analyzer, and the eye perceives no light on the surface of the polarization maintaining material. Therefore, the viewer 34 perceives resolved black (no light) and white (maximum light) on the surface of the polarization maintaining material. The light appears as simple unchanging white light on any other material inserted into the path of the polarization encoded light rays.

In another embodiment of the disclosure, the angular relationship between the planes of polarization of the birefringent materials 30 and the analyzer 24 are established once and remain fixed. However, the angular relationship between the planes of polarization of the pre-polarizer 28, with respect to the planes of polarization of the other optical elements, is allowed to change. In this orientation, only those plane polarized light rays with planes of polarization rotated by the birefringent material to match those of the analyzer can pass through the analyzer. In this latent effects projection system 10, the eye perceives a changing resolved (visible) color on the surface of the polarization maintaining material 22. This changing color is a function of the change in the angle of the plane of polarization of the pre-polarizer. This is a multiple latent effects projector, in that the system is capable of projecting more than one color, at different times, through the optical elements. The color seen by the viewer will change upon rotation of the pre-polarizer. The light appears as simple unchanging white light on any other material inserted into the path of the polarization encoded light rays.

In another embodiment of the disclosure, the angular relationship between the planes of polarization of the pre-polarizer 28 and the analyzer 24 remain fixed. Again, it is best to set the plane of polarization of the analyzer to be either parallel (0 degree) or perpendicular (90 degrees) to the privileged direction of the pre-polarizer. The angular relationship between the planes of polarization of the birefringent materials, with respect to the planes of polarization of the other optical elements, is allowed to change. In this latent effects projection system, the viewer 34 perceives a changing resolved (visible) color on the surface of the polarization maintaining material. This changing color is a function of the change in the angle of the plane of polarization of the birefringent materials. This too is a multiple latent effects projector, in that the system is capable of projecting more than one color, at different times, through the optical elements. Otherwise the system is the same as the previously described embodiment.

In another embodiment the angular relationship between the planes of polarization of the pre-polarizer 28 and the birefringent materials 30 remain fixed. However, the angular relationship between the plane of polarization of the analyzer, in respect to the planes of polarization of the other optical elements, is allowed to change. The viewer 34 perceives a changing resolved (visible) color on the surface of the polarization maintaining material 22. This changing color is a function of the change in the angle of the plane of polarization of the analyzer. Otherwise the system is as before described.

Since the color observed on the polarization maintaining material 22 is a function of the relationship between the angles of the planes of polarization of the pre-polarizer 28, the birefringent materials 30 and the analyzer 24, any method which changes the relationship between these angles can be used to make a latent effects projection system where the color is changeable. The possible methods that could be used include: a) mechanical rotation of the pre-polarizer, or the birefringent materials or the analyzer, or any combination of the above, the axis of rotation being centered or off-centered, parallel or non-parallel with the light path; b) mechanical gobo wheel technologies for the insertion of birefringent or polarized disks into the beam path; c) multiple elements of birefringent materials inserted into the light path; d) the deflection or twisting of a birefringent material relative to the light path about axes not parallel to the light path, for example an axis perpendicular to the plane of the birefringent material and the direction of the light path; e) the insertion of birefringent wedges into the light path, the color varying with wedge position; and f) electrically active birefringent materials such as liquid crystal devices in the light path.

There are many possibilities for implementation of the system, some illustrative examples include inserting a pre-polarizer 28 and a birefringent material 30 between the light source 26 and a projection lens 32 of a theatrical lighting instrument. The polarization encoded light projected will appear as white light unless it is viewed through the analyzer 24, either directly or as reflected from a polarization maintaining material 22. Both the pre-polarizer and the birefringent material can be made rotatable for changing the latent effects projected as discussed above. In another embodiment the pre-polarizer and birefringent material are inserted in a beam path 36 projected from a hand-held flashlight, held in place by structure attached to the flashlight, so the flashlight can be freely carried and aimed. Otherwise the flashlight embodiment functions as the theatrical lighting instrument. In another embodiment the pre-polarizer and birefringent material are inserted between the light source and projection lens of an overhead lighting projector. The mirror in the overhead projector is a polarization-maintaining mirror. Otherwise this embodiment functions as before described. As will be appreciated a number of polarization maintaining mirrors can be inserted in the light path 36 to direct the polarization encoded light to where it is desired.

Moreover, the analyzer 24 can be provided in several ways. The analyzer can be incorporated in glasses worn by the viewer, or can be incorporated in a window or a transparent screen, or a similar structure through which the viewer looks to perceive the polarization maintaining reflective material 22. The polarization maintaining reflective material is illuminated by polarization encoded light traveling along the light path 36 from the projector and which does not pass through the analyzer until after reflecting from the polarization maintaining material.

In the above discussion and examples the polarization-encoded light rays projected have been referred to as appearing "white" when unresolved. In actuality, the color of the light varies as a function of the nature of the light source as modified by the other optical elements in the system. The projected light often acquires a slight blue or green color due to inherent properties of the polarizing filters. The color of the unresolved projected light can be modified also. In one embodiment a non-birefringent non-polarizing color filter or gel can be placed in the light path 36. The placement of the color filter can be between the light source 26 and the eye of the viewer 34 at any location before, after or between the system elements 28, 30, 32, 22, and 24 respectively.

The birefringent materials used in the above discussion and examples, and as used in the following discussion and examples, come in three types. First, standard scientific materials, such as wave retarders, are generally useful for a limited color pallet with specific interference colors. A quarter wave retarder, for instance, allows a transition from a pale blue to a pale yellow color. On the other hand, a second type, comprising sheets of polymeric resin, can be used. Pieces of inexpensive LEXAN (a trademark of General Electric Corp.), a widely available polycarbonate material, generate the best colors to date. Lexan allows transitions from dark blues to purples to deep yellows and apple greens. Some of the more interesting looks can be generated using a third type comprising pieces of extremely inexpensive plastic plates, glasses and dinner utensils. Materials of this type generally create multiple colors in a rainbow like effects. In this context, the cheaper the materials, the better the effects. A uniform birefringence across the active area of the material is also a factor. In instances where the birefringence of a birefringent material is not uniform across the active area of the material, the perceived color on the wearable polarization maintaining material is also not uniform. A blotchy color effects is possible with such inexpensive plastic materials. These inexpensive plastic materials can be clear or transparently colored.

Figure 2:
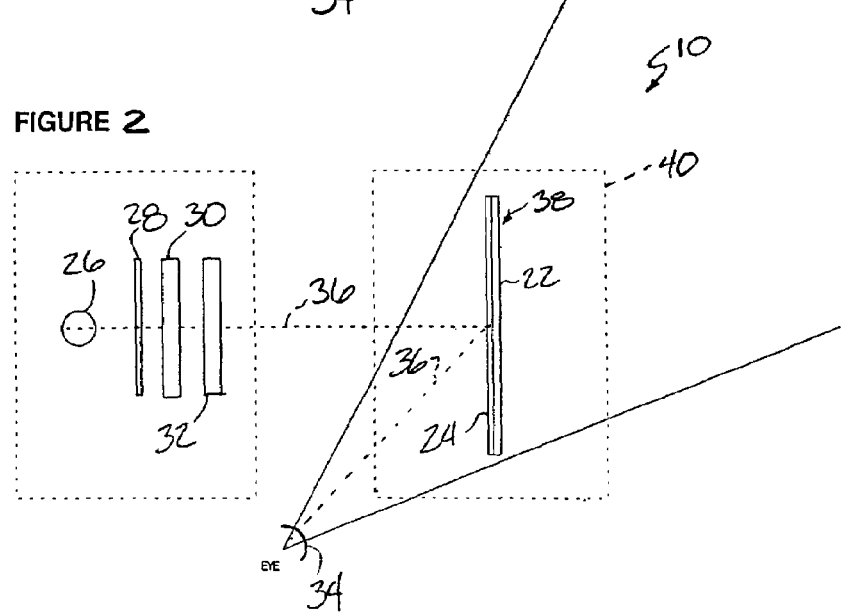
FIG. 2 is a schematic diagram of a further exemplary visual effects system in another embodiment

With reference to FIG. 2, in another embodiment the latent effects projector 20 is as before described, and like reference numbers refer to like components of the system 10, but the polarization maintaining reflective material 22 and the analyzer 24 are both positioned at a surface to be viewed, such as the surface of apparel of a performer. They can be joined as a laminated construction comprising a reflective polarizer 38 incorporated in a wearable reflective polarizing material 40. The polarization-encoded light is projected and manipulated, as before described, except that the light is resolved at the reflective polarizing material; and, accordingly, a separately positioned analyzer is unnecessary. Viewers are able to look directly at the reflective polarizing material 40 and see resolved color there. The laminate could be mounted on objects, such as props carried by performers, or which are stationary, or on background and foreground surfaces on the stage, on statuary, sculptures, walls or floors to name a few examples.

The latent effects projection system 10, in this embodiment works essentially as discussed above in connection with an embodiment where the analyzer 24 is a separate component of the system. This includes the discussions about the relative orientation and rotating the planes of polarization of the various elements of the system. The differences include the fact that the analyzer is a part of the reflective polarizing material 40 which can be supplied to the object. While different orientations of the plane of polarization of the analyzer can be used, the analyzer is generally not rotated unless the reflective polarizing material rotates. This itself can be used as an effect, as the surface of the object to which the material is attached will appear to change color locally as the object moves.

Another difference is that the light path will go through the analyzer twice. In one embodiment the reflective polarizing material 40 comprises an analyzer 24 layer formed of a polarizing material, and a polarization maintaining reflective material 22 layer formed by laminating or coating the material on the back side of the analyzer layer. Light rays traveling along the path 36 of the light will pass through the analyzer to the polarization maintaining reflective material where it is reflected and passes back through the analyzer in the opposite direction. The polarization maintaining material 22 is effective at reflecting the light with minimal rotation of the planes of polarization, otherwise the reflected light passing back through the analyzer again will be diminished.

Figure 3:
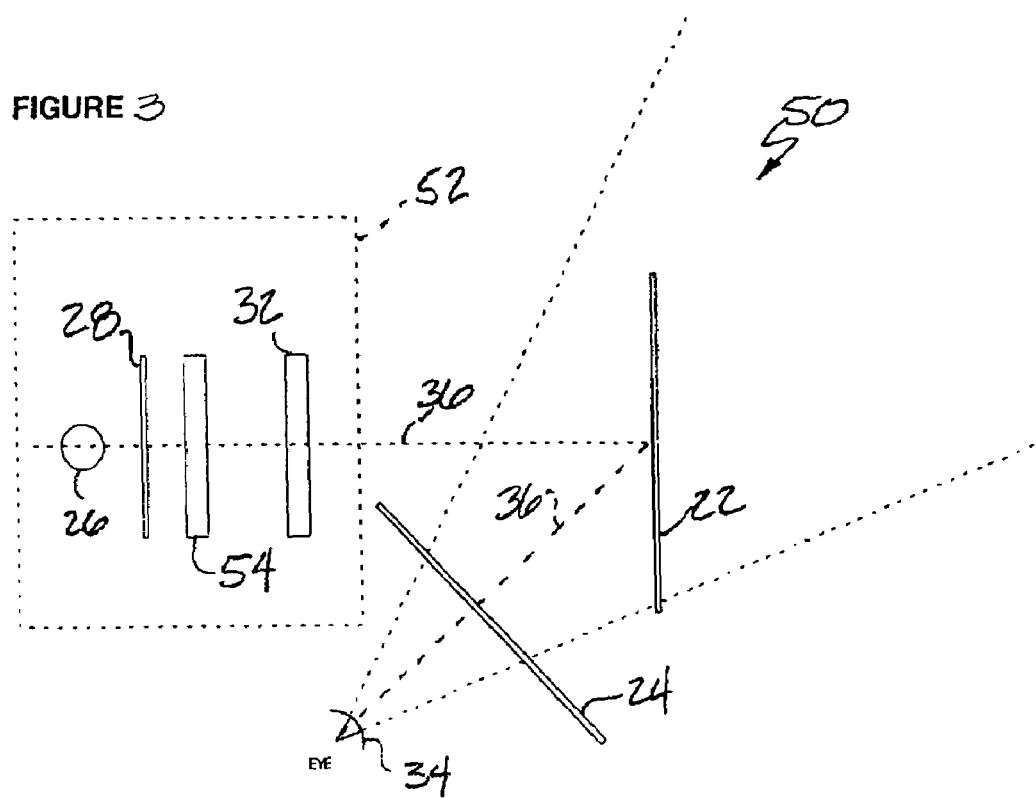
FIG. 3 is a schematic diagram of a visual effects system in another embodiment.

With reference to FIG. 3, which is a schematic diagram of latent effects system that utilizes a latent video image projection system 50. The system comprises a latent video image projector 52, a polarization maintaining material 22, and an independent polarizer (called the polarizing analyzer), or analyzer 24. The latent video image projector is similar to the color projectors described above and is comprised of a light source 26, a pre-polarizer 28, a projection lens 32, and a transmissive-type liquid crystal (hereinafter LC) matrix 54.

As will be appreciated, the latent video image projector 52 is similar in many respects with respect to the latent effects projectors described above, and like elements of the system are referred to with like reference numbers. Light rays from the light source 26, essentially parallel to one another, impinge on, and pass through, the pre-polarizer 28; where they become plane polarized in the privileged direction. As this plane polarized light passes into the LC matrix 54, the polarized light passes through individual pixels. A video signal applied to the pixels induces electric fields that rotate the planes of polarization of the light traveling through the individual pixels. In this way, the video imagery from the video signal is polarization encoded onto the light rays moving through the LC matrix. This rotated plane-polarized light then passes through the projection lens 32. Light, containing a latent image, is projected along a light path 36 onto a polarization maintaining reflective material 22, which is incorporated onto the object. The LC devices comprising the matrix 54 are commercially available. The LC devices enable latent image projectors capable of polarization encoding both color and black and white video images. In this embodiment, as well as all embodiments where an image is projected, proper focus of the image on the polarization maintaining reflective material is essential, and depth of field considerations dictate that object upon whom the image is focused must be moved so as to be coordinated with control of the projector, so that focus of the image can be maintained.

Light rays reflected from the polarization-maintaining reflective material 22 continue along the light path 36 and impinge upon an analyzer 24. Light rays that travel through the analyzer continue on to reach the viewer 34. The plane of polarization of the analyzer is oriented perpendicular to the privileged direction of the pre-polarizer. In this orientation, only those plane polarized light rays that have had their planes of polarization rotated sufficiently to match the orientation of the analyzer by the LC matrix can pass through the analyzer. In this latent video projection system, the eye perceives a resolved (visible) video image on the surface of the polarization maintaining material. The imagery appears as simple white light on any other material inserted into the path of the polarization encoded light rays. The content of the resolved video image can be anything capable of being delivered by a standard video projector. This includes still and motion picture images converted to a video format, live video, still video, pure single colors, anaglyphic information, and other data.

In another embodiment of the disclosure, the plane of polarization of the analyzer 24 is oriented in a different (non-perpendicular) relation to the privileged direction of the pre-polarizer 28. In this latent video projection system 50, the viewer 34 perceives a false color resolved (visible) video image on the surface of the polarization maintaining material 22. The polarization-encoded light still appears as simple white light on any other material inserted into the path of the polarization encoded light rays. The false colors are produced because the LC matrix 54 rotates the plane of polarization of the light rays for each color the right amount so that it will be lined up with the privileged direction of the analyzer, the amount of rotation required being different for each color. If the analyzer is not in the correct orientation to resolve the proper birefringent colors, the resolved colors are wrong and are called false colors.

In one embodiment the latent video projector 52 is produced by the deletion of the analyzer from the light path 36 of a commercially available video projector which utilizes, in sequence, a light source, a pre-polarizer, one LC matrix, an analyzer and a projection lens. The polarization encoded light rays produced by this projector appear to be white light unless viewed through an analyzer 24. This type of latent image projector is capable of polarization encoding both color and black and white video images. The content of the latent video image can be anything capable of being delivered by a standard video projector, discussed above.

In another embodiment a latent video image projector 52 is produced by the insertion of a pre-polarizer 28 and an LC matrix 54, in sequence, between the light source 26 and the projection lens 32 of an overhead lighting projector. In a latent video projector of this type, the polarization encoded light rays are bounced off of a polarization maintaining mirror (not shown) used to change the direction of the light path and then are passed through the projection lens 32. Otherwise the operation of the projector is as before explained.

In another embodiment of the disclosure, a latent video projector 52 is produced by the insertion of a pre-polarizer 28 and an LC matrix 54, in sequence, between the light source and the projection lens of a theatrical lighting instrument. The polarization encoded light rays produced by a latent image projector can be bounced off of a polarization maintaining mirror, or mirrors, to direct the polarization encoded light rays where they are needed.

In each of the above-described projectors 52, the polarization encoded light rays traveling from the projector appear as, and have been referred to, as 'white' light. In actuality however, as with the latent effects projectors described above, the color of the light is a function of the color of the light source modified by the other optical elements in the system. The light may acquire a slight blue or green color due to the color of the polarizing filters.

In one embodiment, the color of the light traveling through the system 50 is modified by the insertion of a non-birefringent color filter or gel. In this embodiment, the unresolved color of the polarization encoded light rays can be any color desired. This color filter can be inserted at a number of places in the system, such as between the light source 26 and the pre-polarizer 28, between the pre-polarizer and the LC matrix 54, between the LC matrix and the projection lens 32, between the projection lens and the polarization maintaining material 22, between the polarization maintaining material and the analyzer 24, and between the analyzer and the viewer 34. In another embodiment of this disclosure, a birefringent colored gel or filter can be used instead, and the latent image projected is modified through the use of the birefringent filter or gel and will be resolved as a false color image.

Figure 4:
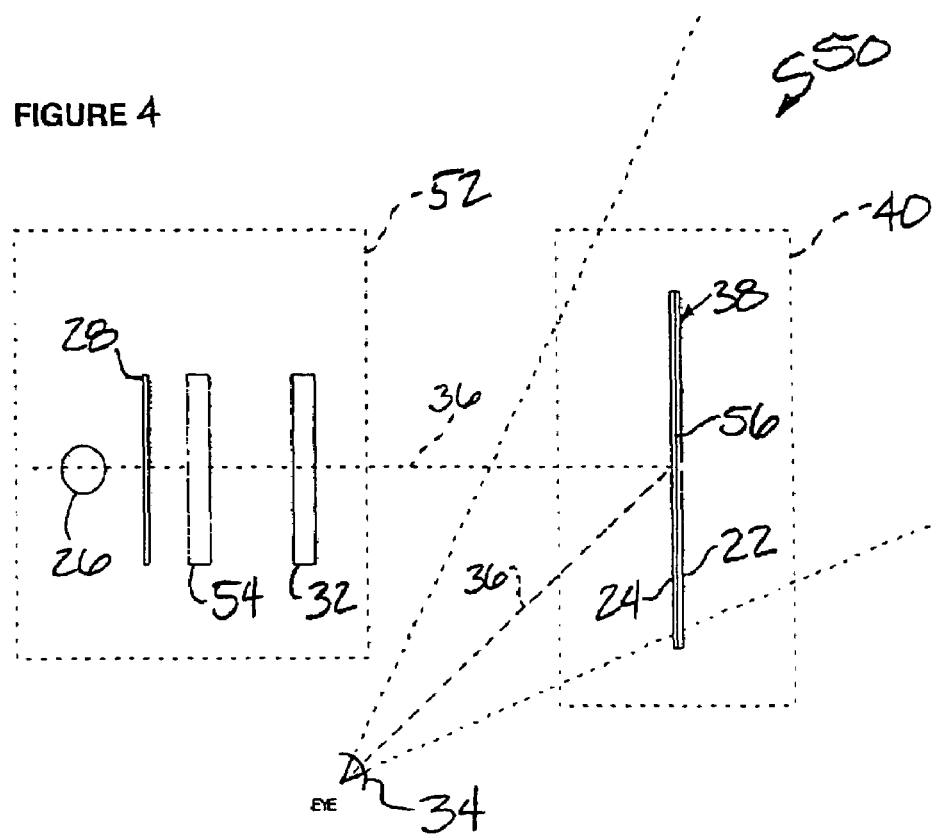
FIG. 4 is a schematic diagram of a visual effects system in another embodiment.

Turning to FIG. 4, in another embodiment the latent effects projection system 50 comprises a latent video projector 52 and a reflective polarizing material 40. The latent video projector is as above described comprising a light source 26, a pre-polarizer 28, a transmissive-type LC matrix 54, and a projection lens 32. The reflective polarizing material comprises a laminated construction comprising a reflecting polarizer 38 including an analyzer 24 and a polarization maintaining reflective material 22, the surface between the layers just described being a polarization-maintaining surface 56.

The latent video image projector 52 functions as before described in connection with a system 50 where a separate and independent analyzer 24 is provided. However, in this embodiment the polarization encoded light rays from the latent video image projector are focused onto the surface of a reflective polarizing material 40. A projected latent video image is resolved at the surface of the apparel of the performer that incorporates the reflective polarizing material. The plane of polarization of the analyzer is again oriented perpendicular to the privileged direction of the pre-polarizer 28, and the system works as before described in other respects. Regarding the reflective polarizing material the polarization encoded light rays bounce off of the polarization maintaining surface 56 and back through the analyzer in the way described above in connection with the color projection system used with the reflective polarizing material. As a result, the eye perceives a resolved (visible) video image on the surface of the reflective polarizing material. The imagery appears as simple white light on any other material inserted into the path of the polarization encoded light rays.

In another embodiment of the latent video image projection system 50, the polarization encoded light rays from the latent video image projector 52 travel along the light path 36 and are focused onto the surface of a reflective polarizing material 40 and the system to this point functions as before described. However, the plane of polarization of the analyzer 24 at the surface of the reflective polarizing material is oriented non-perpendicular to the privileged direction of the pre-polarizer. In this orientation, the viewer 34 perceives a false color resolved (visible) video image on the surface of the reflective polarizing material, as the difference between the angle of orientation of the analyzer and the 90 degree angle from the privileged direction of the pre-polarizer 28 corresponds to a wavelength shift as discussed above. The LC matrix being configured to rotate the plane of polarization of the light rays through each pixel so as to resolve as true color at 90 degrees, rotation of the analyzer will cause the color to change, which can be used as an effect as discussed above in connection with color projection.

Utilizing one or more of the principles above-described, the latent effects system may be advantageously utilized in connection with floor tiles, including terrazzo tiles. Since it is anticipated that the flooring would be fabricated using a plurality of floor tiles, e.g., multiple 12 inch by 12 inch tiles, the discussion that follows need only address a single floor tile, it being understood that the same procedures hereinafter described may be utilized in connection with some or all of the floor tiles of which a floor is comprised.

Considering where a floor is to be comprises of terrazzo type tiles, i.e., tiles composed of concrete that will be adapted to include embedded polarized chips, pieces or cutlets, the polarized chips will more than likely need to be water and solvent proof, have a surface tough enough to resist the abrasion of people walking on the surface, and be strong enough to survive the manufacturing process. To meet these needs, a terrazzo tile may be constructed using concrete and polarized cutlets. In this regard, since typical polarizers are chemically reactive with solvents and water, and many organic polarizers breakdown when confronted with elevated temperatures and pressures, the preferred material for use as a laminate for the polarizers is glass since glass is much tougher than plastic. Given this, the polarized cutlets to be used in connection with the terrazzo tile are preferably composed of polarized pieces embedded in clear resin and cut into rock like shapes with a laser cutter. Since the resin cutlets may be too soft for long-term use as a cutlet in a terrazzo tile, polarizers laminated between glass using a 3M optically clear adhesive may be used where the glass is cut using a water cutter device. The edges of the cutlets are preferably treated so as to make the cutlet waterproof. Alternately, a non-water soluble adhesive and polarizer could be used.

Another approach to a terrazzo tile is to laminate small pieces of polarizer between larger pieces of transparent material suitable for use as a walking surface. For example, a terrazzo tile may be comprised of two pieces of acrylic with polarizer chips sandwiched between them. Since the acrylic may be too soft for long-term use as a walking surface, a manufacturing process known to be utilized by Simtec Design, Inc. (that laminates two surfaces of a PETG (resin) material together with the capability of sandwiching unlike material between the two sheets) may be used to laminate reflective polarization materials. The URL for Simtec Design is info@simtecsurfaces.com. Chips manufactured in this manner may exhibit inconsistent color across the surface of the chip owing to the birefringent properties of PETG. However, using the Simtec Design process to bond a piece of PETG to glass, with the polarizer chips between the surfaces, works well for use in connection with terrazzo tiles.

With respect to tiles to be used in connection with architectural surfaces, low volume floors, wall surfaces, and the like (hereinafter referred to as a "wall tile"), a wall tile may be generated by using two pieces of acrylic and a single large piece of polarizer. The large piece of polarizer is preferably sandwiched between the two pieces of acrylic and the edges may be sealed using tape. Since this construction may be best suited for limited time use, a further construction may be made by again laminating a single piece of polarizer between two pieces of PETG. Preferably, the polarizer is perforated, e.g., by using a laser cutter, to allowed the PETG to migrate through the polarizer to form a bond. With such a tile, a latent color projector produces good even color across the tile while a latent image projector produces a good video image.

A still further type of wall tile may be produced using the Chameleon Effects described in U.S. Pat. No. 6,301,044. In these effects, polarized chips, in a random orientation, are brought together into a single surface. This single surface is composed of a high number of identical shaped pieces (Motif) that have either identical polarization directions or non-identical polarization directions. Since many of the reflective polarization materials used for this system are 10 to 30 millimeters thick, which makes picking up and placing the pieces difficult, it may be desirable to laminate the flexible preferred polarizer to a thin piece of Plexiglas or other material. Spray 77, Barge, contact cement are acceptable adhesives to use. Once the preferred polarizer is laminated to the backing, the pieces can be picked up, manipulated and placed with relative ease. It is also to be understood that the Motif shapes can include squares, triangles, circles, hexagons, etc., that the pieces can be tightly packed together or they can be loosely packed, that there can be grout between the tiles or no grout between the tiles, and that single motif tiles (e.g., all squares) or multiple motif tiles (e.g., trapezoid and triangle) can be made.

When manufacturing these types of tiles it will be appreciated that there is a problem associated with getting the proper polarization angles for each piece. As a case in point, if a laminated polarizer is cut into circles, and then a tile is built up out of the circles, when placed each of the circles will have a unique preferred orientation. Thus, it is likely that the entire surface of the tile will be covered in chips with random polarization directions. As a counter point, assume that squares are cut of a laminated polarizer. Further assume that the squares are all cut the same direction on the material. If the squares are made into a tile, then the squares can only exhibit two polarization directions depending on their rotation. Since a square will only fit with flat sides to flat sides a square can only rotate 90 degrees and still fit. In this case the chip can be at 0, 90, 180, or 270 degrees and, as such, the entire surface of the tile will be covered in chips with only 2 polarization directions.

To change the number of polarization angles exhibited by a tile surface, the original orientation of the polarizer is preferably determined before the initial cut of the laminated polarizer. To this end, a large sheet of laminated polarizer may be used to cut out large motif shapes, e.g., using a laser cutter, whereby the large motif shapes are chosen (e.g., approximately 6" or more) and cut out of the laminate at slightly different angles, (0, 3, 6, 9, 12, 15 degrees, etc.) to form blanks. Once these blanks are made the blank can be placed at a known orientation (usually parallel to one side of the cutter) and smaller shapes can be cut. The number of polarization angles on the finished piece would then be essentially the number of angle-oriented blanks cut out of the original laminate.

In order to minimize waste it is best if the blank piece is the shape of the small tile actually being used on the finished product. As a case in point, cutting small squares out of a large square leads to less waste than cutting small triangles out of large squares. Small circles always lead to a waste stream so it is best to compose a large shape out of a pile of small circles and attempt to minimize the loss. Alternately, the original large shapes can be cut out of the polarizer before it is laminated to the backing, thereby saving both adhesive and backing material.

Still further, in the fabrication of a tile, a jig can be made so as to speed up the process. For example, assuming a chip that is one-quarter inches square, there would be four chips per inch, twelve inches per side for forty-eight chips per side making over a thousand chips per tile. The jig is composed of four pieces of Plexiglas. Two of the pieces are sheets, larger than the square area of the finished tile. The other two sheets have the same outer dimensions as sheets 1 & 2 but they also have a central "void" cut out that matches the size and shape of the finished tile. The 4 pieces can be connected together using bolts. The central pieces can be sandwiched between the other two sheets.

To use the jig, one of the continuous pieces and one of the central pieces are connected together using bolts. The central piece is used to make a pocket for the small polarized chips to be laid into. The chips are placed polarizer side up into this form. This allows a last step check of the chip quality to be performed. After the complete tile has been inserted, the other continuous piece is bolted onto the rig covering the chips just installed. The rig is then turned over; the back piece is removed showing the back surfaces of the polarized chips. The second central piece is then connected to the front and central piece using the bolts. The void in the second central piece can be used as a guide for the placement of the suitable substrate. The adhesion method of the chips to a suitable substrate can now be performed.

The described types of wall tiles exhibit a range of looks and feels depending on the shape of the tile and the type of projector used to project on the tile. When used in connection with a latent color projector, the use of tightly packed randomly oriented square tiles leads to a look that is reminiscent of a blinking lights control panel. Alternately a tightly packed identically orientated square tile set looks like bathroom tile until the system changes color all at once. The tightly packed identically orientated tile also works very well with the latent image projector, giving a clean crisp image with good saturation. With the latent image projector, the more the shapes are rounded and irregular, and the greater the randomness of the polarization direction, the more the Chameleon Effects is pronounced.

Still further, using a latent color projector with a random square tile wall (as described above) and a large lens generates a weird otherworldly "hyperspace" effects that is more of an art form. In this context the tile wall may be placed outside of the focal length of a large lens, such as a Fresnel lens. A viewer guest is aligned along the axis of the lens and is moved from infinity to the focal length of the lens. As the latent color projector rotates the polarizer, the color on the tile wall is randomly distributed. As this light passes through the lens the randomly blinking tiles appear to be moving into or out of the center of the wall depending on where the viewer is positioned.

It is additionally contemplated that signage could be included as part of wall treatment, tile work, or embedded in a flooring material to create billboards, point of sales displays, text messages, Company Logos, etc. To this end, text messages on signage can be either black and white or color. Thus, in this context, one signage application may be to provide text letters cut out of the appropriate polarizer and applied onto a different piece of polarizer such that the background changes color as the text changes color. The color change can be identical or different. Furthermore, the text letters may be cut out of a polarizer and the cut out piece applied to another polarizer such that the text cutouts change color as the foreground changes color. Again, the color change can be identical or different.

It will be further appreciated that signage applications need not be limited to text only. Since the latent color projector output is a latent color distinguishable by a specific angle of rotation, it is possible to define a color as a function of angle and generate static images, or simple step animations.

A variant of the signage application utilizes the 3M Diffuse Reflective Polarizer film (DRPF). In this variant a black text message is hidden behind the white film and the latent color projector is used to illuminate the laminate. The text message shines through the white DRPF and changes color as the polarizer at the light source rotates. The DRPF film remains pretty much the same color throughout the rotation of the light source polarizer. There are possibly many variants of this technology utilizing many of the 3M LCD films as will be described further hereinafter.

With respect to hangings, many of the 3M polarization materials are reflective along one axis and transmissive along a different orthogonal axis. These polarizers can be used as hanging colored filters that generate "complimentary" colored shadows. For example, a transparent substance may be laminated to a transmissive/reflective polarizer and then hung in front of a white surface. In this manner, the latent color projector illuminates the hanging laminate. The hanging laminate will exhibit the color expressed by the orientation of the birefringent filters and the orientation of the reflective axis of the polarizer. However, those frequencies that are not reflected by the polarizer can pass through the polarizer to the white surface. The laminate will thus exhibit a certain color while the shadow exhibits a different color.

It will also be understood that the subject system may be utilized in connection with art pieces. For example, with respect to art pieces, some of the tile wall variants are remarkably compelling as wall treatments, e.g., square wall tiles composed of randomly oriented square polarized chips with a latent color projector where the randomly changing colored tiles provide a soothing effect. Further, the 'hyperspace' effects discussed in the wall treatment section is another good example of an art piece. Still further, the colored shadows as discussed above are another example of an art piece.

By way of further example, the principles disclosed herein may be utilized to provide a polarized kaleidoscope. In a kaleidoscope system, an illuminated source shined up though a transmissive polarizer composed of concentric rings of polarization material will exhibit different polarization angles per ring. Above this surface may be placed three birefringent plates that overlap in an "Olympic rings" configuration and, above this overlapping layer, may be placed another transmissive polarizer. The three birefringent sheets are free to rotate such that, as a viewer rotates one of the birefringent sheets, the color though the entire system changes in a very compelling manner.

In practice, the previously described reflective polarizers generally produce a metallic color pallet when combined with the latent color projector. Furthermore, the previously described reflective polarizers themselves generally have a shiny surface with shiny highlights providing the reflective polarizers with a very distinctive metallic look. Thus, to provide for a more varied color palette to be generated and/or to provide artists with reflective polarizers that may have additional "looks," additional embodiments of reflective polarizers are hereinafter described.

Figure 5:
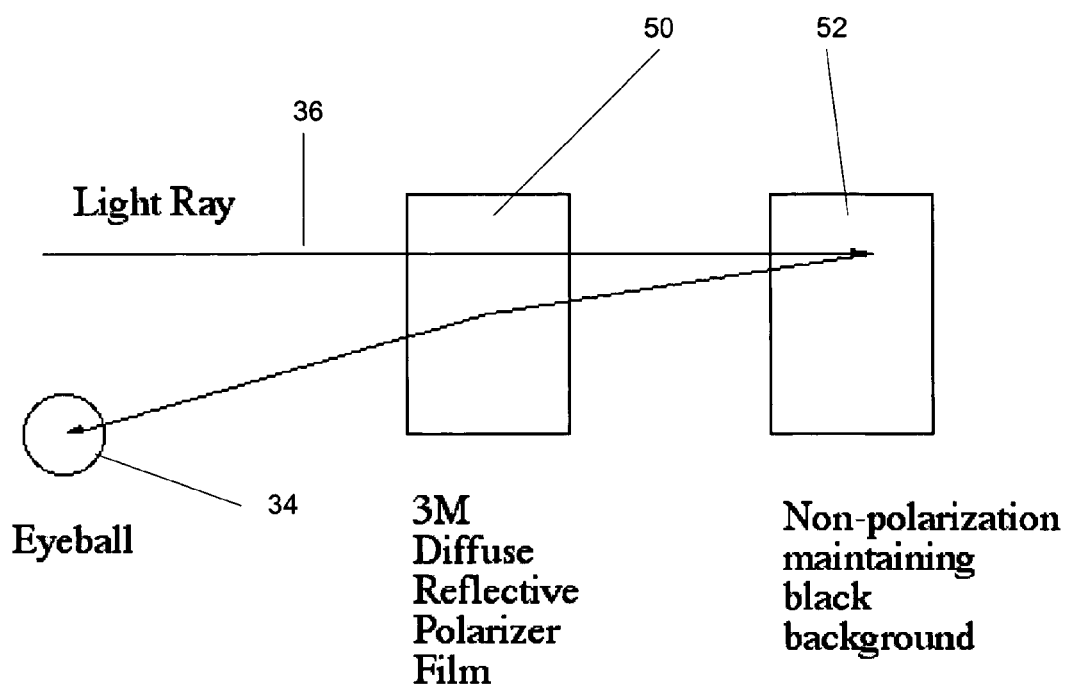
FIG. 5 is a schematic diagram of a visual effects system specifically utilizing a diffuse reflective polarizer film.

With reference to FIG. 5, a further reflective polarizer 38 may be formed using a diffuse reflective polarizer film manufactured by 3M under the trade name "DRPF." Specifically, a layer of non-polarization maintaining material 52 may be applied to a layer of the 3M diffuse reflective polarizer film 50. By way of example, the non-polarization maintaining material 52 may be paint applied to the back of the 3M diffuse reflective polarizer film 50. Alternative non-polarization maintaining materials may be manufactured from fabric or a hard surface. Preferably, the selected non-polarization maintaining material 52 is black in color.

Figure 6:
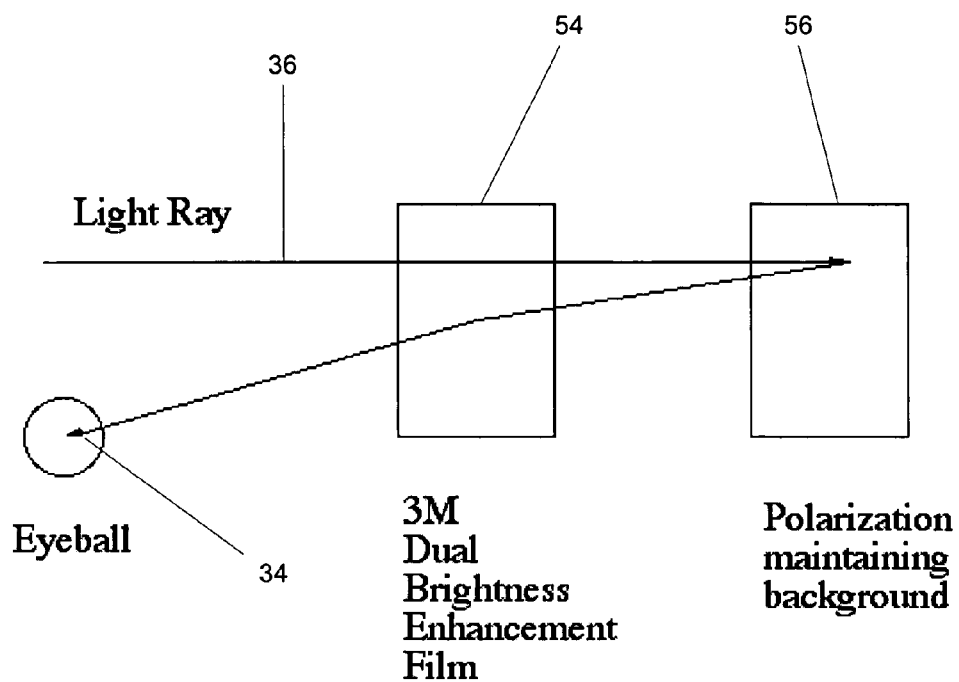
FIG. 6 is a schematic diagram of a visual effects system specifically utilizing a dual brightness enhancement film.

Sill further, with reference to FIG. 6, a 3M dual brightness enhancement film, such as sold under the trade name "DBEF," can be used as a type of reflective polarizer. To this end, the back surface of a layer of the 3M dual brightness enhancement film 54 is provided with a polarization maintaining material 56. The polarization maintaining material 56 can be paint, a fabric, or a hard surface. Preferably, the color of the selected polarization material is silver.

Figure 7A:
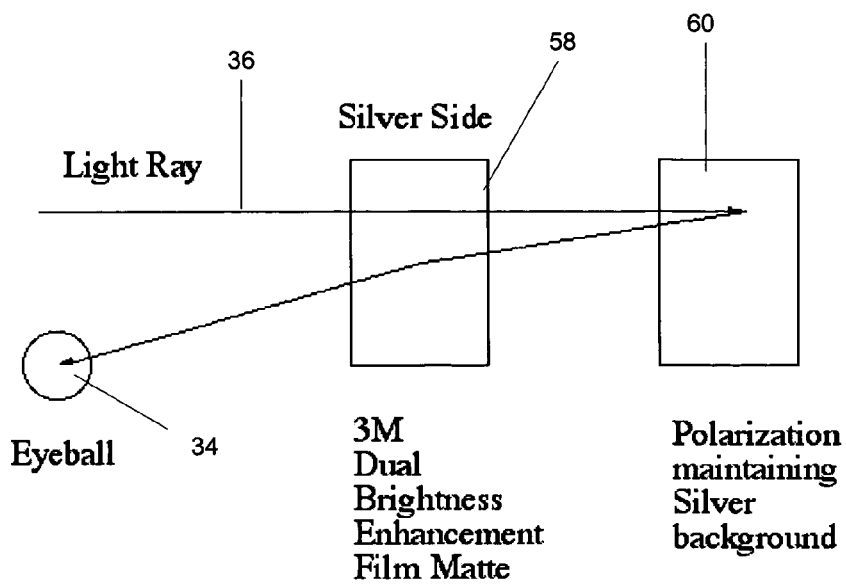
FIG. 7 is a schematic diagram of a visual effects system specifically utilizing a dual brightness enhancement film—matte.
Figure 7B:
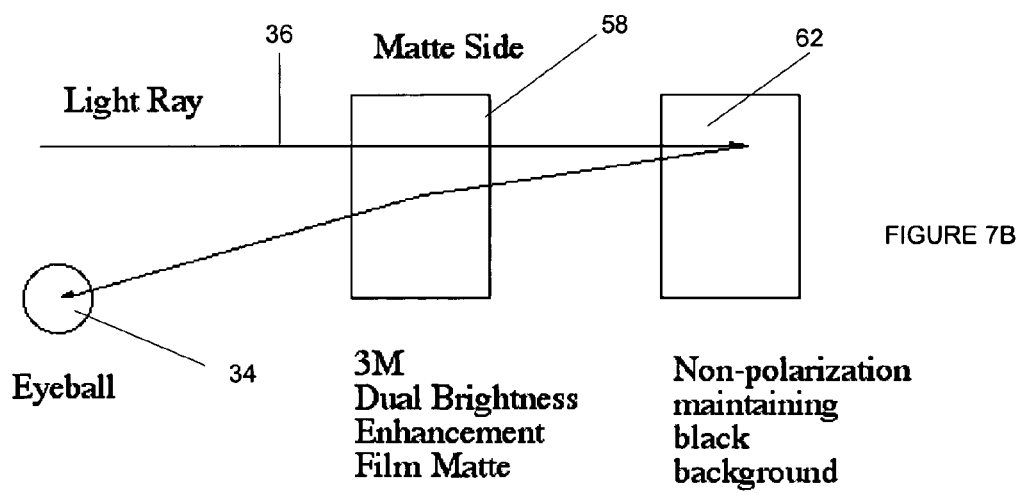

Yet further, with reference to FIG. 7, a 3M dual brightness enhancement film matte, such as sold under the trade name "DBEF-M," can be used as a type of reflective polarizer. The material has a different "look" front and back and so there are two possible configurations. In a first configuration, illustrated in FIG. 7a, when the front surface is silver, the back surface of the material 58 may be provided with a polarization maintaining material 60. The polarization maintaining material 60 can be paint, a fabric, or even a hard surface. Preferably, the color of the polarization maintaining material is silver. In a second configuration, illustrated in FIG. 7b, when the front surface is matte, the back surface of the material 58 may be provided with a non-polarization maintaining material 62. The non-polarization maintaining material 62 can be paint, a fabric, or even a hard surface. Preferably, the color of the non-polarization maintaining material 62 is black.

Figure 8A:
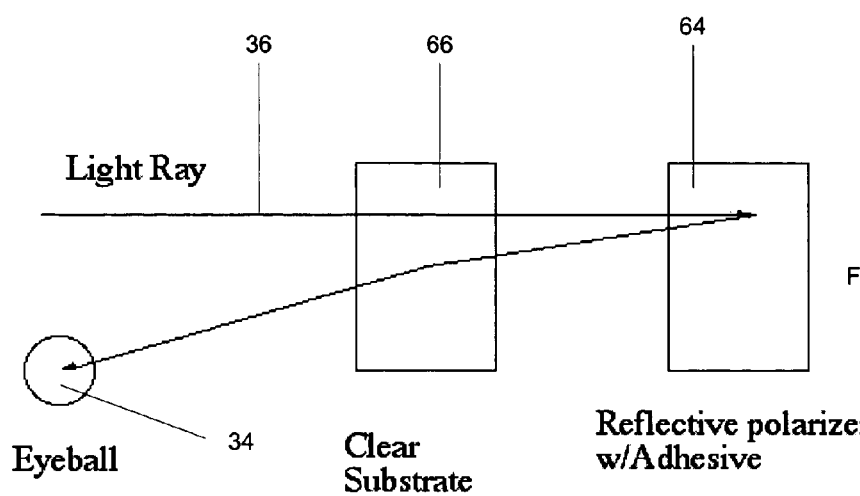
FIG. 8 is a schematic diagram of a visual effects system specifically utilizing a transparent material.
Figure 8B:
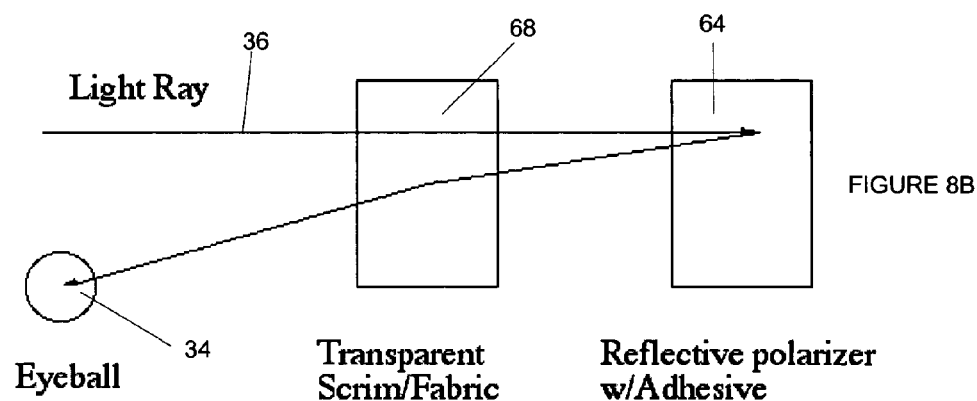

Even further, with reference to FIG. 8, a layer of a 3M reflective display film—Black with adhesive 64, such as sold under the trade name "RDF-B," can be used as a type of reflective polarizer when provided with either a clear substrate 66 or a transparent scrim like material 68. In this case the clear material 66 (or scrim 68) can be either birefringent or not. Furthermore, the use of a fabric on the first surface of the combined pieces generates a distinctly different look for the system.

Construction of a reflective polarizer may also be accomplished using a material manufactured by International Polarizer, such as sold under the trade name "Linear Polarizer IP-38."

Since organic polarizers generally have an upper temperature limit of approximately 70 degrees Centigrade, it is seen the organic polarizers may melt when used with standard theatrical light fixtures, thus meaning that the polarizers that are part of such of a system are consumables of the system which, in turn, has the disadvantage of driving the cost of the system up. Furthermore, the use of organic polarizers in a system tends to limit the system to the generation of predominately pastel colors while the use of material such as lexan pieces with random retardation values as retarders, makes the repeatability of color ranges difficult. Thus, further systems are hereinafter described that are relatively insensitive to heat, generate saturated colors, generate latent colors that are substantially repeatable, and/ or which can repeatably project a single, known, invisible color on cue.

More specifically, the following describes systems that use: high temperature aluminum polarizers to make relatively heat insensitive latent color projectors, retarders to generate saturated colors with a metallic character (since random pieces of polycarbonate materials tend to generate pastel and non-saturated colors); retarders to generate substantially repeatable latent color ranges (since random pieces of polycarbonate materials typically generate random later colors); a multiple angle polarization target that can be used to view the entire latent color range of the system at a single glance (since standard single polarization angle test targets will generally not allow a researcher to generate and view the entire color range of the system); and/or a method to call up a specific latent color on cue (since once a specific latent color is repeatably assigned to a specific polarization angle, that specific latent color can be generated on cue).

Figure 9:
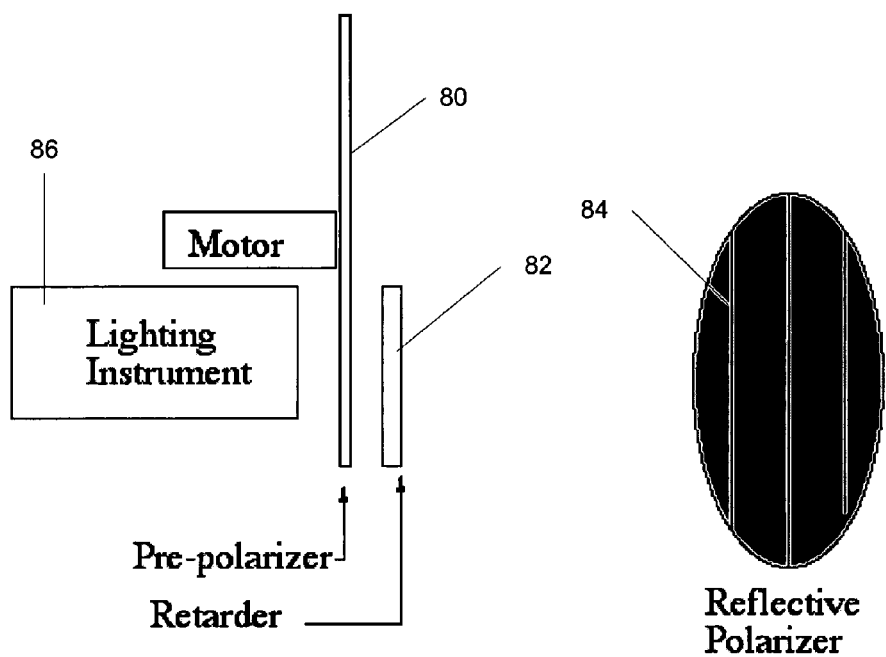
FIG. 9 is a schematic diagram of an exemplary visual effects system utilizing a single retarder.

By way of background and with reference to FIG. 9, in the previously described latent color projector systems the light is plane polarized by an organic polarizer 80 and birefringent color is added to the light beam by the lexan retarder 82. The light hitting the target 84 has a specific single latent color (usually a pastel) while the light hitting the area around the target is white. More specifically, the oversized organic polarizer 80 is rotated in front of a lamp fixture 86 (the organic polarizer 80 being at least twice as large as the lens opening of the lamp fixture 86) and a carefully chosen piece (or pieces) of lexan were inserted and held in the beam path of the light fixture outboard of the organic polarizer as the retarder 82. In this case, the organic polarizer 80 has a tendency to overheat, bubble and melt if left too long in the light path of the lamp fixture 86. Further, since the lexan retarder 82 is a standard piece of off the shelf plastic that has not been manufactured for specific optical properties, its latent color properties are not controllable. In this context, the latent color generated by pieces of plastic of this type are random and unknown.

Figures 10A, 10B:
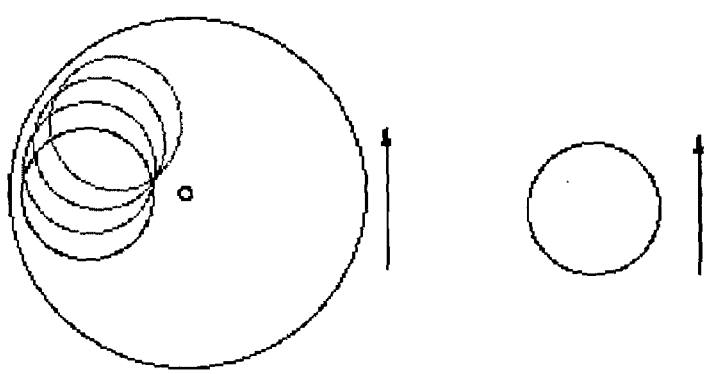
FIG. 10 is a schematic diagram of depicting exemplary motions of a polarizer.

Turning to FIG. 10, the previously described latent color projector design had the polarizer 80 sweep through the light coming from the lamp fixture 86 (FIG. 10*a*) whereas a more compact and preferable design calls for a polarizer 80 to rotate in the beam path (FIG. 10*b*). To this preferable end, an aluminum on glass polarizer 80 allows for an optical system that has the polarizer in the beam path at all times. In the previously described system, the organic polarizer 80 "swept" through the light beam so as to keep the temperature of the filter within operating range. However, an aluminum polarizer 80 can be in the light path at all times. The filter can therefore be much smaller, essentially just larger than the light beam at the moment of impact and the polarizer 80 would no longer be considered as part of the waste stream or consumables. The best aluminum polarizer on glass found to date is manufactured by a company called Moxtec, Inc. under the trade name "Proflux wire grid polarizers". Still further, such a high temperature polarizer 80 allows for the determination of a precise polarization angle in reference to a specific latent color, to be discussed below.

Figure 11:
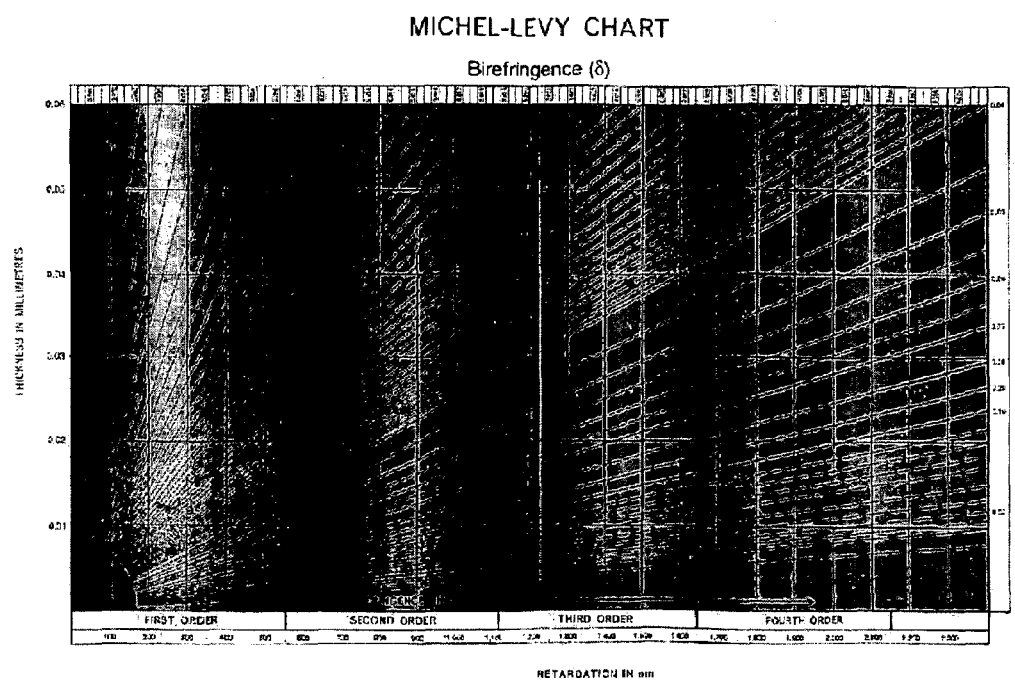
FIG. 11 illustrates a Michel-Levy Chart that plots birefringent color as a function of retardation.

Standard scientific retarders generally come in a limited number of values. These retarders typically have a center frequency and a typical center frequency is 560 nanometers. Standard retardation values are ¼ wave (e.g., 140 nanometers), ½ wave (e.g., 280 nanometers) and full wave (e.g., either 530 or 560 nanometers). A Michel Levy chart, shown in FIG. 11, can be used to predict the birefringent color passed through retarders. In the case of a 280-nm retarder, the color is a dirty yellow, a 530-nm retarder should generate a reddish blue, while a 560-nm retarder should generate a slightly higher bluish red. The Michel Levy chart may also be used to predict the color passed through multiple retarders when the retardation of each retarder is added together.

Figure 12:
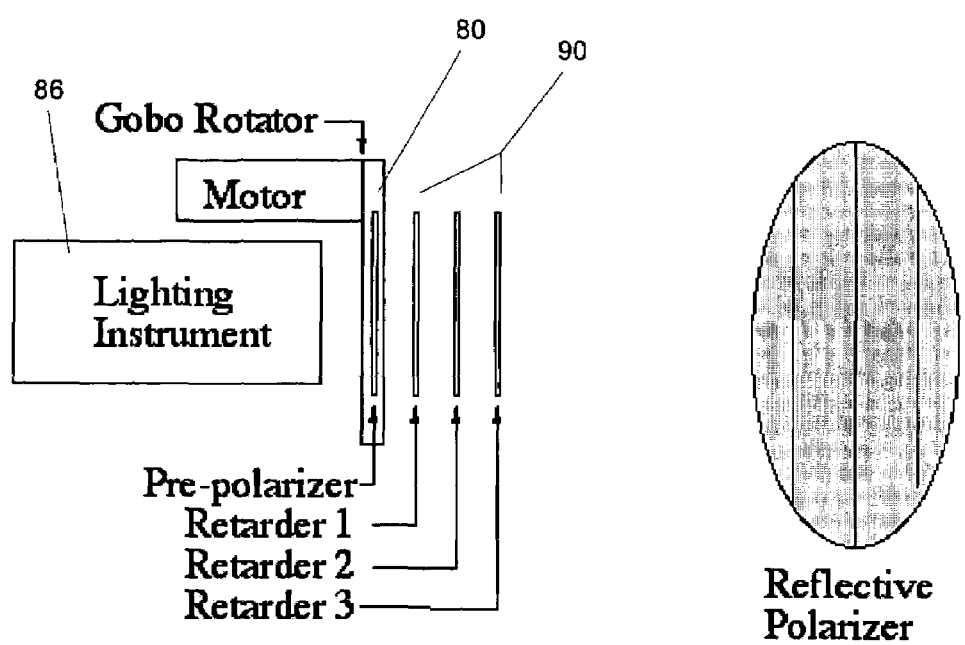
FIG. 12 is a schematic diagram of an exemplary visual effects system utilizing a plurality of retarders.

Now, assuming that the polarizer 80 is utilized in connection with a plurality of retarders 90, as is illustrated in FIG. 12, and the light is plane polarized by the aluminum polarizer and birefringent color is polarization encoded into the light by the scientific retarders. In this case, as the polarizer 80 is rotated the angular relationships with the target changes and latent colors sequentially appear on the target. To calibrate the system for the entire latent color spectrum of the system, a technique to generate a polarized birefringent rotary tool for use in connection with this is now described. In this regard, the tool may be used as a means to view the entire latent color range of the system at one time whereby a determination may be made whether or not a generated color is worth using.

Figure 13:
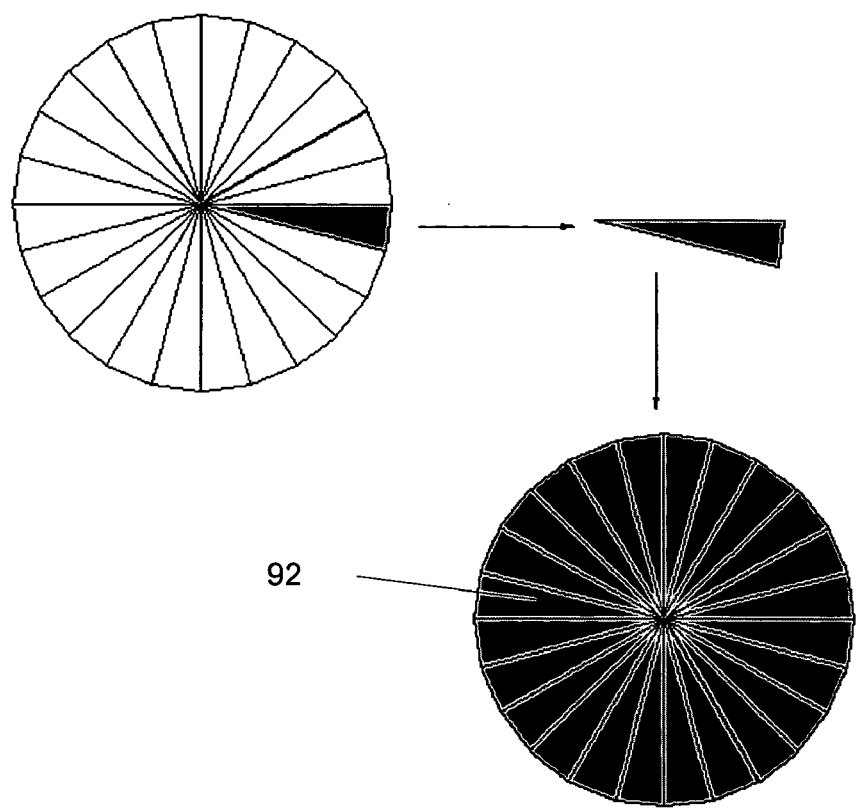
FIG. 13 is a schematic diagram of a polarized birefringent tool.

With reference to FIG. 13, a reflective polarizer tool 92 may be formed in a circle where a decision over the angular resolution of the system is made. For a crude tool 92 an angular resolution of 15 degrees per piece is acceptable. However, the more pieces in the tool 92 the better the angular resolution. Nevertheless, in keeping with the illustrated embodiment, a standard 15-degree piece is designed and 24 of these pieces are cut out of a polarizer, e.g., using a laser cutter if one is available. Preferably, all of the pieces should have an identical polarization angle. Another way of saying this is to cut identical pieces out of the same polarizer using identical orientations on the polarizer.

The prepared pieces of the polarizer may then be placed into the shape of the circular tool 92. When this occurs, the placement of the pieces rotates the polarization angle of the piece by 15 degrees in relationship to the pieces on either side. It will be understood that, when the entire structure is complete, there is a complete 360-degree shift of polarization angles throughout the structure.

Figure 14:
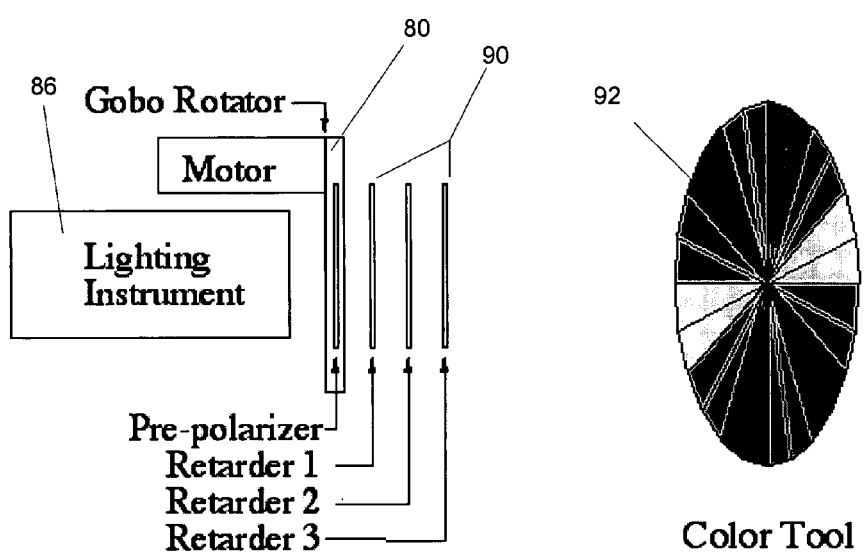
FIG. 14 is a schematic diagram illustrating use of the polarized birefringent tool of FIG. 13 in the system of FIG. 12.

Now, using the tool 92, filter combinations may be arrived at that are capable of generating a full spectrum of useful colors. The colors are metallic in nature, they are extremely saturated, and they are substantially repeatable. More specifically, a technique for generating filter combinations, for use in a system such as illustrated in FIG. 14, is to take two polarizers and place them in the crossed position on a light table. In the crossed position the pair should transmit no light. Take a useful retarder, such as a 530 or 560 nanometer retarder, and place it between the two crossed polarizers. Rotate the retarder so that you get the brightest (i.e., highest interference color) throughput through the system. The interference color should be a blue or a reddish blue. At this time, take a 140 nanometer retarder and place it between the crossed polarizers and above the other retarder. Rotate the 140 nanometer retarder so that the light through the crossed polarizers and the 140 nanometer retarder is the least (i.e., lowest interference color). Lock the laminate together being careful to maintain the angular relationship between the two retarders. Place the retarder lamination between the latent color projector polarizer and the polarized birefringent rotary tool 92. Rotate the retarder laminate until the color spectrum appears. Lock it in this orientation to the polarizer.

This system generates a useful spectrum of colors including purple, reddish, orange, yellow, green and blue. The system works well with 530 and 560 nanometer retarders coupled with the 140 nanometer retarder.

For three or more retarders systems, the best technique is to take two polarizers and place them in the crossed position on a light table. In the crossed position the pair should transmit no light. Take a useful retarder, such as a 530 or 560 nanometer retarder, and place it between the two crossed polarizers. Rotate the retarder so that you get the brightest (i.e., highest interference color) throughput through the system. The interference color should be a blue or a reddish blue. Take a second retarder, such as a 530 or 560 nanometer retarder, and place it between the two crossed polarizers above the original retarder. Rotate the second retarder so that you get the brightest (i.e., highest interference color) throughput through the two crossed polarizers and the second retarder. Place the second retarder over the first. At this time make sure that the combined light throughput of the two retarders is also the brightest throughput (i.e., highest interference color) for the system. At this time, take a 140 nanometer retarder and place it between the crossed polarizers and above the other two retarders. Rotate the 140 nanometer retarder so that the light through the crossed polarizers and the 140 nanometer retarder is the least (i.e., lowest interference color). Lock the laminate together being careful to maintain the angular relationship between the three retarders. Place the retarder lamination between the latent color projector polarizer and the polarized birefringent rotary tool 92. Rotate the retarder laminate until the color spectrum appears. Lock it in this orientation to the polarizer.

It should be appreciated that other configurations of birefringent materials and polarizers can be used in the same way as described above. The scientific retarders can be replaced by standard pieces of lexan, and the same technique can be used to generate a birefringent color spectrum. In some instances the birefringent color spectrum generated by the lexan is qualitatively close to the birefringent color spectrum generated by the scientific retarders. It is recommended that a scientific 140 nanometer retarder be used for the final retarder.

It should also be appreciated that rotating a retarder to the brightest orientation or to the darkest orientation between crossed polarizers is somewhat a matter of taste. In this context there are other patterns of retarders that can be used to generate the birefringent color spectrum. As a case in point, take a useful retarder, such as a 530 or 560 nanometer retarder, and place it between two crossed polarizers. Rotate the retarder so that you get the brightest (i.e., highest interference color) throughput through the system. The interference color should be a blue or a reddish blue. Take a second retarder, such as a 530 or 560 nanometer retarder, and place it between the two crossed polarizers above the original retarder. Rotate the second retarder so that you get the brightest (i.e., highest interference colors) throughput through the two crossed polarizers and the second retarder. Place the second retarder over the first. At this time, take a 140 nanometer retarder and place it between the crossed polarizers and above the other two retarders. Rotate the 140 nanometer retarder so that the light through the crossed polarizers and the 140 nanometer retarder is the brightest (i.e., highest interference color). Place the third retarder over the first and second. Lock the retarder laminate together so that the angular relation between the retarder plates becomes fixed. Place the retarder lamination between the latent color projector polarizer and the polarized birefringent rotary tool 92. Rotate the retarder laminate until the color spectrum appears. Lock it in this orientation to the polarizer. The fact that there is a preferred method for orienting retarders should not be taken as the only way to orient the retarders 530 nanometers+530 nanometers+140 nanometers.
530 nanometers+560 nanometers+140 nanometers.
560 nanometers+560 nanometers+140 nanometers.
530 nanometers+530 nanometers+530 nanometers+140 nanometers.
530 nanometers+530 nanometers+560 nanometers+140 nanometers.
530 nanometers+560 nanometers+560 nanometers+140 nanometers.
560 nanometers+560 nanometers+560 nanometers+140 nanometers.
530 nanometers+560 nanometers+560 nanometers+140 nanometers
530 nanometers+530 nanometers+530 nanometers+530 nanometers+140 nanometers.
530 nanometers+530 nanometers+530 nanometers+560 nanometers+140 nanometers.
530 nanometers+530 nanometers+560 nanometers+560 nanometers+140 nanometers.
530 nanometers+560 nanometers+560 nanometers+560 nanometers+140 nanometers.
560 nanometers+560 nanometers+560 nanometers+560 nanometers+140 nanometers.
530 nanometers+530 nanometers+560 nanometers+560 nanometers+140 nanometers.

It will be understood that other configurations are also possible when calibrating the system since retarders can be used to add or subtract nanometers in various arrangements.

At this time it is important to address the issue of substantially repeatable birefringent colors or substantial repeatability. When a series of retarders are used in a latent color projector it is extremely difficult to generate "identical" color pallets. As will be appreciated, the colors polarization encoded by a latent color projector are due to essentially the retardation value of the retarders and the angular relationship between the polarizers and the retarders in the series. In this case it turns out that two latent color projectors manufactured with the same polarizers and the same retarder values can turn out latent color spectrums that are qualitatively different to the eye. In these cases, the latent color spectrums are both useful, but they do not color match exactly. Sources of error that appear to contribute to these slight differences in the latent color spectrum are, but are not limited to, non-uniform birefringence across the active area of the retarder, the non-flatness of the retarder allowing light rays to impinge on the surface of the retarder in a non-perpendicular fashion, and manufacturing variances (typically +/−20 nanometers) of the retarders.

As will be appreciated, once the relationship between a birefringent color (essentially the series of retarders) and a polarization angle has been defined, the device can be used to call up a specific latent color on cue. This gives the lighting designer substantial control of the system.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method of calibrating a polarized light projector system including a latent color projector adapted to project light including visual information, the method comprising:
   arranging a pair of polarizers such that transmission of the projected light through the pair of polarizers is substantially inhibited;
   placing a first retarder between the pair of polarizers;
   rotating the first retarder to a position that provides substantially the brightest throughput through the pair of polarizers;
   placing a second retarder between the pair of polarizers and behind the first retarder;
   rotating the second retarder to a position that provides substantially the least throughput through the pair of polarizers;
   fixing the angular relationship between the first and second retarders forming a retarder laminate;
   inserting the retarder laminate between the polarizer closest to the latent color projector and a birefringent rotary tool;
   rotating the retarder laminate until a color spectrum appears on the rotary tool; and
   locking the retarder laminate in this orientation relative to the polarizer closest to the latent color projector.

2. The method as recited in claim 1, wherein the first retarder comprises a 530 nanometer retarder.

3. The method as recited in claim 1, wherein the first retarder comprises a 560 nanometer retarder.

4. The method as recited in claim 1, wherein the second retarder comprises a 140 nanometer retarder.

5. The method as recited in claim 1, wherein a lexan material is substituted for at least one of the first and second retarders.

6. The method as recited in claim 1, wherein the brightest throughput provides an interference color that is blue or reddish blue in color.

7. A method of calibrating a polarized light projector system including a latent color projector adapted to project light including visual information, the method comprising:
   arranging a pair of polarizers such that transmission of the projected light through the pair of polarizers is substantially inhibited;
   placing a first retarder between the pair of polarizers;
   rotating the first retarder to a position that provides substantially the brightest throughput through the pair of polarizers;

placing a second retarder between the pair of polarizers and behind the first retarder;

rotating the second retarder to a position that provides substantially the brightest throughput through the pair of polarizers and the first retarder;

placing a third retarder between the pair of polarizers and behind the second retarder;

rotating the third retarder to a position that provides substantially the least throughput through the pair of polarizers and the first and second retarders;

fixing the angular relationship between the first, second, and third retarders forming a retarder laminate;

inserting the retarder laminate between the polarizer closest to the latent color projector and a birefringent rotary tool rotating the retarder laminate until a color spectrum appears on the rotary tool; and locking the retarder laminate in this orientation relative to the polarizer closest to the latent color projector.

8. The method as recited in claim 7, wherein at least one of the first and second retarders comprises a 530 nanometer retarder.

9. The method as recited in claim 7, wherein at least one of the first and second retarders comprises a 560 nanometer retarder.

10. The method as recited in claim 7, wherein the third retarder comprises a 140 nanometer retarder.

11. The method as recited in claim 7, wherein a lexan material is substituted for at least one of the first, second and third retarders.

12. The method as recited in claim 8 wherein the brightest throughput provides an interference color that is blue or reddish blue in color.

13. A method of calibrating a polarized light projector system including a latent color projector adapted to project light including visual information, the method comprising:

arranging a pair of polarizers such that transmission of the projected light through the pair of polarizers is substantially inhibited;

placing a first retarder between the pair of polarizers;

rotating the first retarder to a position that provides substantially the brightest throughput through the pair of polarizers;

placing a second retarder between the pair of polarizers and behind the first retarder;

rotating the second retarder to a position that provides substantially the brightest throughput through the pair of polarizers and the first retarder;

placing a third retarder between the pair of polarizers and behind the second retarder;

rotating the third retarder to a position that provides substantially the brightest throughput through the pair of polarizers and the first and second retarders;

fixing the angular relationship between the first, second, and third retarders forming a retarder laminate;

inserting the retarder laminate between the polarizer closest to the latent color projector and a birefringent rotary tool;

rotating the retarder laminate until a color spectrum appears on the rotary tool; and locking the retarder laminate in this orientation relative to the polarizer located nearest the latent color projector.

14. The method as recited in claim 13, wherein at least one of the first and second retarders comprises a 530 nanometer retarder.

15. The method as recited in claim 13, wherein at least one of the first and second retarders comprises a 560 nanometer retarder.

16. The method as recited in claim 13, wherein the third retarder comprises a 140 nanometer retarder.

17. The method as recited in claim 13, wherein at lexan material is substituted for at least one of the first, second and third retarders.

18. The method as recited in claim 13, wherein the brightest throughput provides an interference color that is blue or reddish blue in color.

19. A method of calibrating a polarized light projector system including a latent color projector adapted to project light including visual information, the method comprising:

arranging a pair of polarizers such that transmission of the projected light through the pair of polarizers is substantially inhibited;

placing a first retarder between the pair of polarizers;

rotating the first retarder to a position that provides substantially the brightest throughput through the pair of polarizers;

placing a second retarder between the pair of polarizers and behind the first retarder;

rotating the second retarder to a position that provides substantially the brightest throughput through the pair of polarizers;

fixing the angular relationship between the first and second retarders forming a retarder laminate;

inserting the retarder laminate between the polarizer closest to the latent color projector and a birefringent rotary tool;

rotating the retarder laminate until a color spectrum appears on the rotary tool; and locking the retarder laminate in this orientation relative to the polarizer closest to the latent color projector.

20. The method as recited in claim 19, wherein the first retarder comprises a 530 nanometer retarder.

21. The method as recited in claim 19, wherein the first retarder comprises a 560 nanometer retarder.

22. The method as recited in claim 19, wherein the second retarder comprises a 140 nanometer retarder.

23. The method as recited in claim 19, wherein a lexan material is substituted for at least one of the first and second retarders.

24. The method as recited in claim 19, wherein the brightest throughput provides an interference color that is blue or reddish blue in color.

* * * * *